United States Patent [19]
Eriksson

[11] 3,787,146
[45] Jan. 22, 1974

[54] DELIVERY CONTROL SYSTEM FOR A MOTOR DRIVEN COMPRESSOR

[75] Inventor: Sven Evald Eriksson, Kontich, Belgium

[73] Assignee: Atlas Copco Aktiebolag, Nacka, Sweden

[22] Filed: Aug. 4, 1971

[21] Appl. No.: 168,856

[52] U.S. Cl. ............................................. 417/299
[51] Int. Cl. ............................................ F04b 49/02
[58] Field of Search ........................... 417/299, 310

[56] References Cited
UNITED STATES PATENTS
| | | | |
|---|---|---|---|
| 1,062,665 | 5/1913 | Richards | 417/299 |
| 1,102,273 | 7/1914 | Johnson | 417/299 |
| 3,119,550 | 1/1964 | West et al. | 417/299 X |
| 3,122,308 | 2/1964 | Andersson et al. | 417/310 |
| 3,205,823 | 9/1965 | Brown | 417/310 |

Primary Examiner—C. J. Husar
Assistant Examiner—Leonard Smith
Attorney, Agent, or Firm—Munson & Fiddler

[57] ABSTRACT

A screw compressor is mounted on a truck and adapted to deliver compessed air for ground checks, starting jet engines, and air-conditioning aircraft cabines. Its delivery pipe has an automatic discharge valve for venting to the atmosphere part or all of the compressed air so that the pressure in the delivery pipe will vary within very close limits independently of the amount of air utilized. The discharge valve is pneumatically controlled by means of a pressure relay which has a very quick action.

5 Claims, 4 Drawing Figures

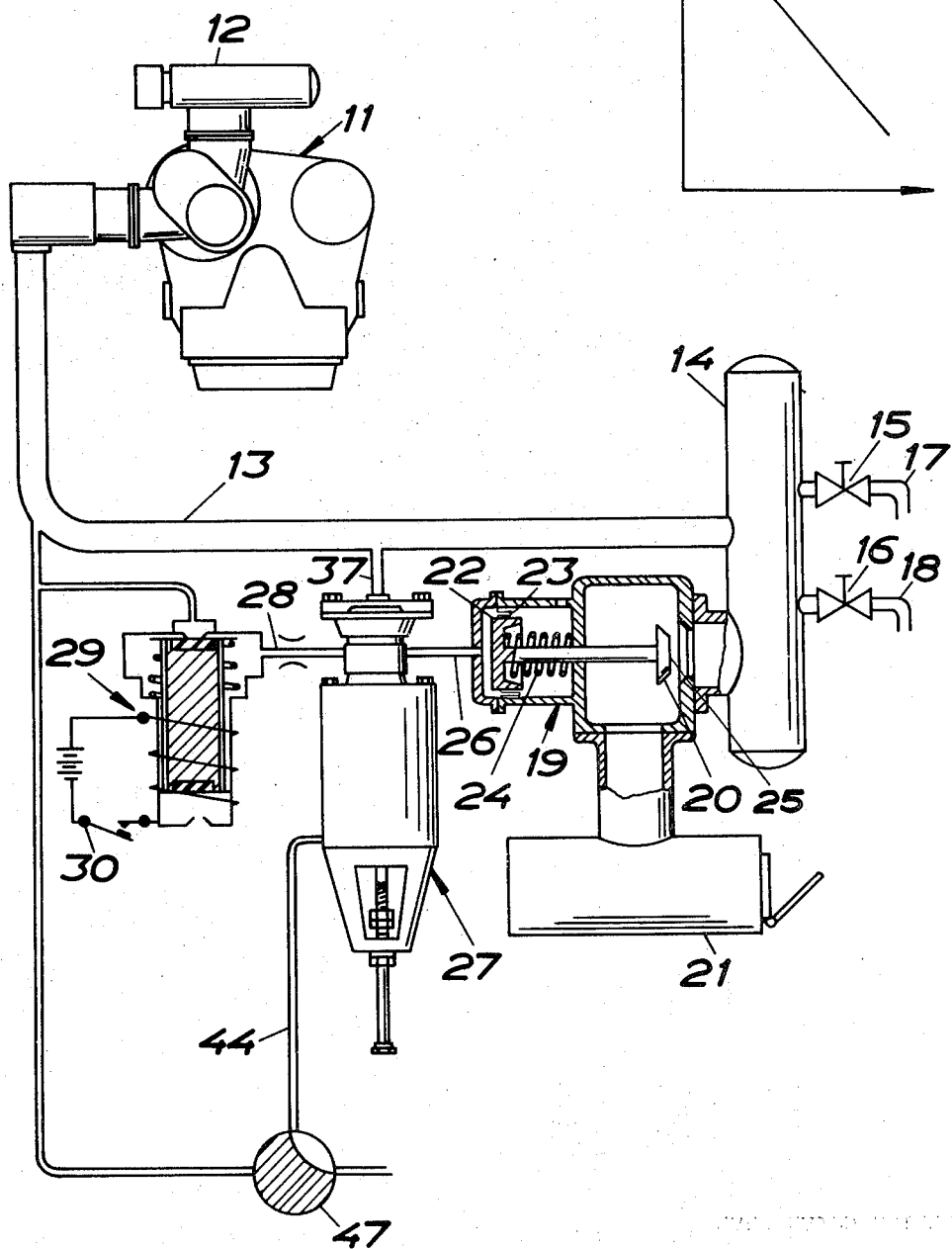

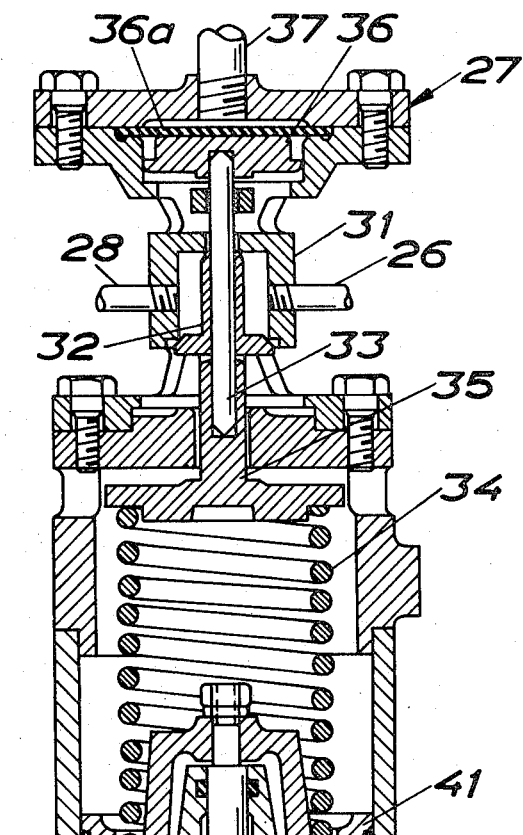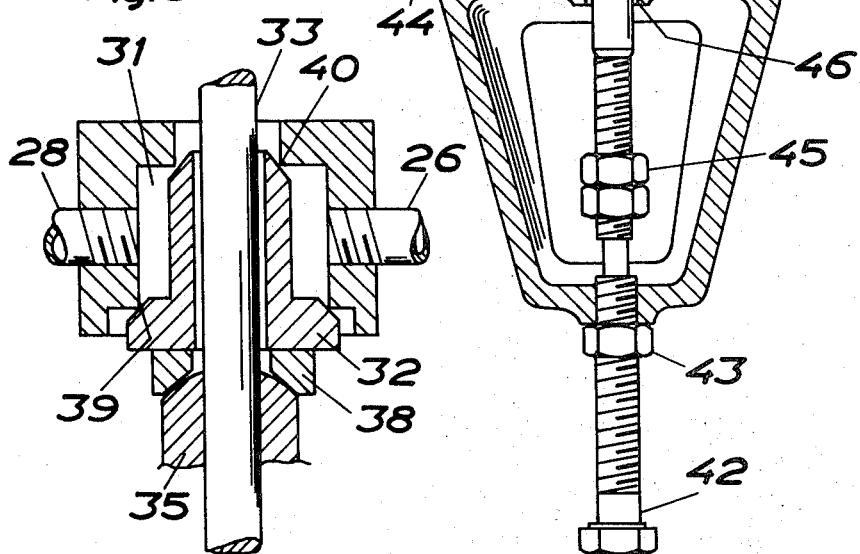

DELIVERY CONTROL SYSTEM FOR A MOTOR DRIVEN COMPRESSOR

BACKGROUND OF THE INVENTION

This invention relates to a delivery control system for a motor driven compressor device and it relates also to a pneumatic relay which can advantageously be used in such a control system.

The engines of jet aircrafts are started by compressed air. For that purpose a compressor is usually used which has a delivery pipe with a venting valve as well as an outlet adapted to be connected to the air intake of an aircraft by means of a hose. Usually the air intake of the aircraft is controlled from the cockpit of the aircraft while the compressor is running at a constant speed. The pressure in the delivery pipe should be maintained nearly constant by the venting valve and the venting valve should maintain this pressure nearly constant also when the delivery pipe is suddenly opened to the jet engine as well as suddenly closed again.

It is an object of the invention to provide a control system which is quick in action and operates to regulate the delivery pressure of a compressor within very close limits even if the consumed air varies abruptly between none and the full delivery of the compressor.

BRIEF DESCRIPTION OF THE DRAWING

In the accompanying drawings: one embodiment of a delivery control system according to the invention is shown diagrammatically in FIG. 1, as an example;

FIG. 2 is an enlarged section through a pressure relay shown in FIG. 1;

FIG. 3 is an enlarged section of a part of FIG. 2, and

FIG. 4 is a diagram showing the characteristic curve of the pressure relay shown in FIG. 2.

In FIG. 1 a positive displacement compressor of the screw rotor-type is denoted generally by the reference numeral 11. It is usually mounted on a truck and driven by a diesel engine. It has an inlet silencer 12 and it delivers compressed air to a delivery conduit 13 which includes a manifold 14 with shut-off valves 15,16 to which hoses 17, 18 are connected. A discharge valve assembly 19 with a valving member 20 is also connected to the manifold 14 so as to permit venting of the delivery conduit 13 to the atmosphere through a silencer 21. The valving member 20 has a head 25 and a piston 22 which is sealed off by a rolling membrane 23. It is biased open by means of a spring 24 in a vented chamber and by the air pressure acting upon its head 25. The valving member 20 will therefore move in response to the variations of the air pressure in a control passage 26 which air pressure acts upon the piston 22. This pressure is controlled and varied by a pressure relay of the bleed-off type generally designated by 27. The pressure relay is supplied with compressed air or vented through a restricted passage 28 depending on the position of an electromagnetic three-way valve 29 which is shown in its position for venting the passage 28. When, however, a switch 30 is closed, the valve 29 shifts into its non-illustrated position for connecting the conduit 28 with the delivery conduit 13.

The pneumatic relay 27, FIGS. 2, 3, comprises a valve chamber 31 to which the restricted passage 28 and the control passage 26 are connected. A valving member 32 is guided by a pin 33 which extends through the valve chamber, and it is loaded towards closed position by means of a spring 34 and a member 35. The valving member 32 is loaded towards open position by the air pressure in the control chamber 31, and a piston 36 — sealed by a membrane 36a — is loaded in the same direction by the air pressure in the delivery conduit 13 transmitted through a conduit 37. A ring 38 between the valving member 32 and the member 35 has a conical surface abutting against a spherical surface on the member 35. Because of the ring 38 and a play between the valving member 32 and the pin 33 the valving member is free to move a little laterally as well as tilt a little and it will therefore fit closely in its seats at 39, 40.

A piston-like element 41 forms an abutment for the spring 34 and the spring can be pre-loaded and manually adjusted by means of a screw 42 and a nut 43. When, however, compressed air is supplied through a conduit 44, the piston-like element 41 is displaced upwardly until a nut 45 abuts at 46. By means of a three-way valve 47, the pre-load of the spring 34 can be shifted between two pre-set values which can be adjusted by means of the screw 42 and the nut 45, respectively. Every specific value of the pre-load of the spring gives a specific value of the pressure in the delivery conduit and, thus, by means of the valve 47, the pressure in the delivery conduit 13 can easily be changed from one pre-set pressure to the other and vice versa. Normally, the lower pre-set pressure is used for air-conditioning of an aircraft cabin and for ground checks and the higher pre-set pressure for starting the jet engines of the aircraft.

When the jet engines of an aircraft are to be started, one of the hoses 17, 18 or both e.g. the hose 17 is connected to an air intake connection on an aircraft. The operator sets the motor of the compressor to a normal and constant speed. The solenoid valve 29 is in the illustrated position in which it vents the passage 28, and the discharge valve 19 is therefore fully open. When the compressor has run up to its normal speed, the operator closes the switch 30 and the solenoid valve 29 starts conveying compressed air to the passage 28 and the air pressure is transmitted through the valve chamber 31 — the valve member 32 is closed because of the relatively low air pressure in the delivery conduit 13 and control conduit 37 — and into the passage 26 so that the discharge valve 19 closes fully or partly. Now, as the pressures in the valve chamber 31 and in the conduit 37 rise the valve member 32 is forced downwards so that air bleeds to the atmosphere at 39 and 40. The air pressure in the valve chamber 31 and thereby in the passage 26 will be varied in this way so that the discharge valve 19 always bleeds off just enough air to maintain the pressure in the delivery conduit constant. In FIG. 4 the characteristic curve of the pressure relay is shown i.e. the pressure in the passage 26 as a function of the pressure in the passage 37. This characteristic curve is approximately a straight line.

When the operator has opened the valve 15 and the pilot or engineer in the cockpit of the aircraft has opened, by remote control, a conduit to one of the engines, the engine takes a lot of air. The pressure relay reacts immediately as the pressure drops in the delivery pipe 13 and the discharge valve 19 closes so that the pressure drop in the delivery pipe 13 will be small and the pressure rises almost instantaneously again to the pre-set value. In the same way, when the pilot or engineer shuts off the air intake, the discharge valve 19 will open fully or partly so that the pressure rise in the delivery pipe 13 will also be small and the pressure will again drop quickly to the pre-set value.

It is to be understood that the described control system and the described pressure relay are only illustrative to the invention and that the invention may be varied in many ways within the scope of the claims.

What I claim is:

1. A delivery control system for a motor driven compressor device for supplying compressed air to a receiver at a substantially constant pressure comprising:
   a. a delivery conduit for conducting compressed air from said compressor device;
   b. discharge valve means in air flow communication with said delivery conduit and disposed to vent a part or all of the compressed air in said delivery conduit to the atmosphere;
   c. said discharge valve means being movable from a fully closed position to a fully open position for controlling the discharge pressure to the receiver;
   d. said discharge valve means being loaded towards open position by the discharge pressure to the receiver and towards closed position by a control pressure;
   e. pneumatic relay means for controlling said control pressure on said discharge valve means including;
      i. a control chamber in flow communication with said discharge valve means;
      ii. a restricted passage for admitting compressed air from said delivery conduit to said control chamber at a predetermined flow value effective to move said discharge valve means in a direction towards closed position;
      iii. a valving member disposed to bleed air from said control chamber for effecting said discharge valve means to move towards open position;
      iv. said valving member being loaded towards closed position by a preset force, and
      v. said valving member being loaded towards open position by said control pressure in said control chamber and by the pressure in said delivery conduit.

2. A system as defined in claim 1 in which said discharge valve means is urged towards open position by means of a spring.

3. A system as defined in claim 1 in which a valve is provided for venting the restricted passage to the atmosphere thereby releasing said control pressure for releasing the pressure in said delivery conduit thus unloading said compressor device.

4. A system as defined in claim 1 in which said preset force is obtained by means of a spring.

5. A system as defined in claim 4 in which said preset force on the valving member can be rapidly changed between preset values by means of a pressure operated piston acting on the spring, thereby rapidly changing the pressure in the delivery conduit between two preset values.

* * * * *